United States Patent [19]

Bondurant

[11] Patent Number: 5,454,349
[45] Date of Patent: * Oct. 3, 1995

[54] REMOVABLE SCREEN FOR ANIMAL LITTER BOX

[76] Inventor: John P. Bondurant, III, 106 Braeburn Dr., Athens, Ga. 30601

[ * ] Notice: The portion of the term of this patent subsequent to Aug. 30, 2011 has been disclaimed.

[21] Appl. No.: 298,072

[22] Filed: Aug. 30, 1994

Related U.S. Application Data

[63] Continuation-in-part of Ser. No. 122,765, Sep. 16, 1993, Pat. No. 5,341,763.

[51] Int. Cl.$^6$ .................................................. A01K 29/00
[52] U.S. Cl. ............................................................ 119/166
[58] Field of Search ................................... 119/161, 165, 119/166, 167, 168; 209/417

[56]     References Cited

U.S. PATENT DOCUMENTS

| | | |
|---|---|---|
| 2,741,223 | 4/1956 | Winborn, Jr. . |
| 2,963,003 | 12/1960 | Oberg . |
| 2,971,493 | 2/1961 | Robb . |
| 3,141,441 | 7/1964 | Russell . |
| 3,476,083 | 11/1969 | Vander Wall . |
| 3,752,120 | 8/1973 | Pallesi . |
| 3,990,397 | 11/1976 | Lowe, Jr. . |
| 4,190,525 | 2/1980 | Menzel . |
| 4,359,966 | 11/1982 | Casino . |
| 4,517,920 | 5/1985 | Yamamoto . |
| 4,802,442 | 2/1989 | Wilson . |
| 4,817,560 | 4/1989 | Prince . |
| 5,293,837 | 3/1994 | Caldwell . |
| 5,341,763 | 8/1994 | Bondurant, III ........................ 119/166 |

FOREIGN PATENT DOCUMENTS 2625957  12/1977  Germany .

Primary Examiner—Gene Mancene
Assistant Examiner—Thomas Price
Attorney, Agent, or Firm—Jones & Askew

[57]     ABSTRACT

A litter screen for use with an animal litter box, for removing solid waste products from the litter box. The litter screen has a hollow body of circular cross-section, open at an upper end and having a perforate screen element at a lower end. A number of curvilinear bars or straight bars form the screen element in the preferred embodiments. The litter screen is lifted from the litter box for removing solid waste products, and then is returned to the litter box by pressing the bottom of the litter screen against litter in the box while pressing the litter screen downwardly and simultaneously oscillating the litter screen so that the lower end moves downwardly through the litter. A skirt surrounds the litter screen in the box to control dust from the litter while the litter screen is being removed from or returned to the litter box.

5 Claims, 4 Drawing Sheets

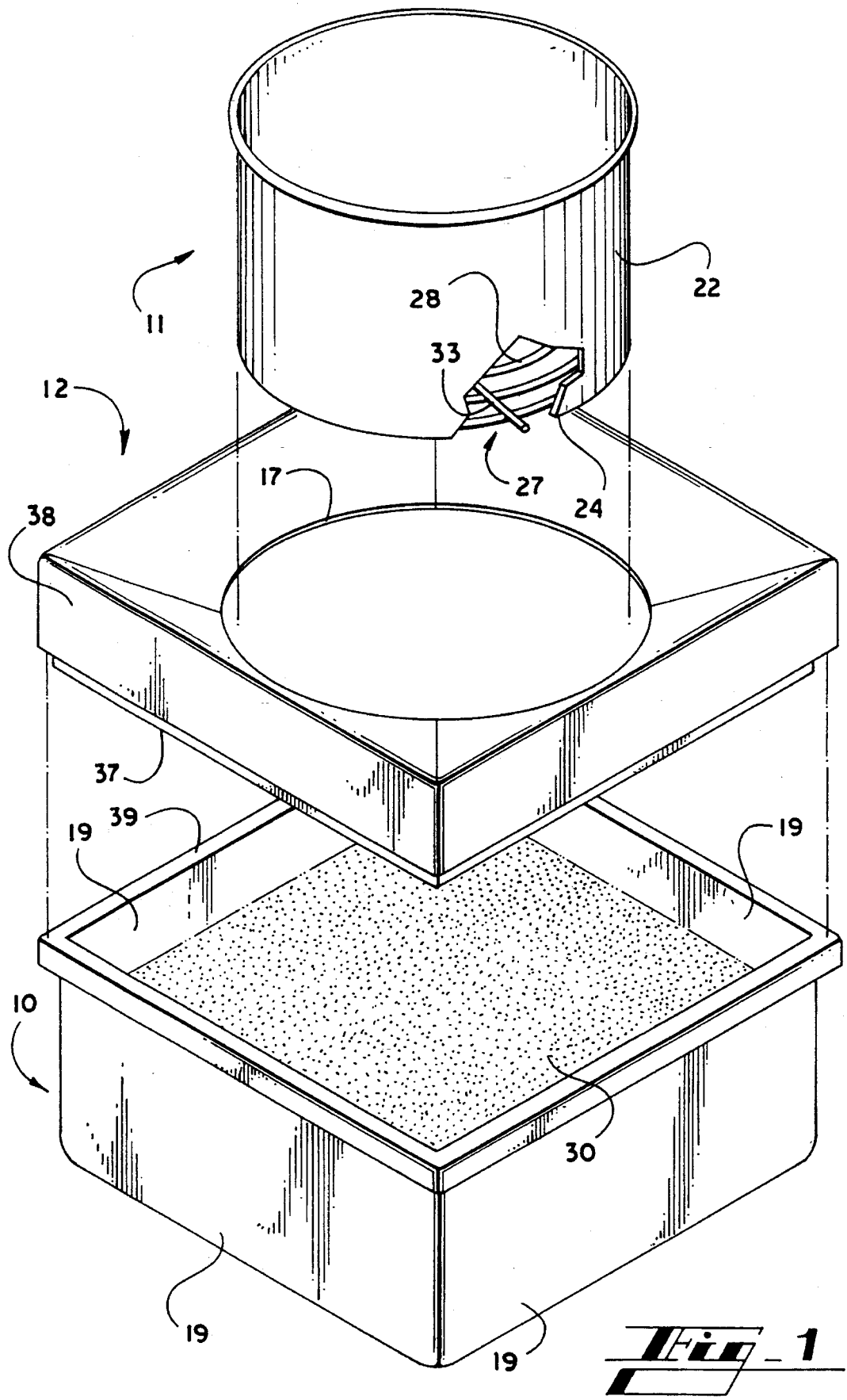
Fig_1

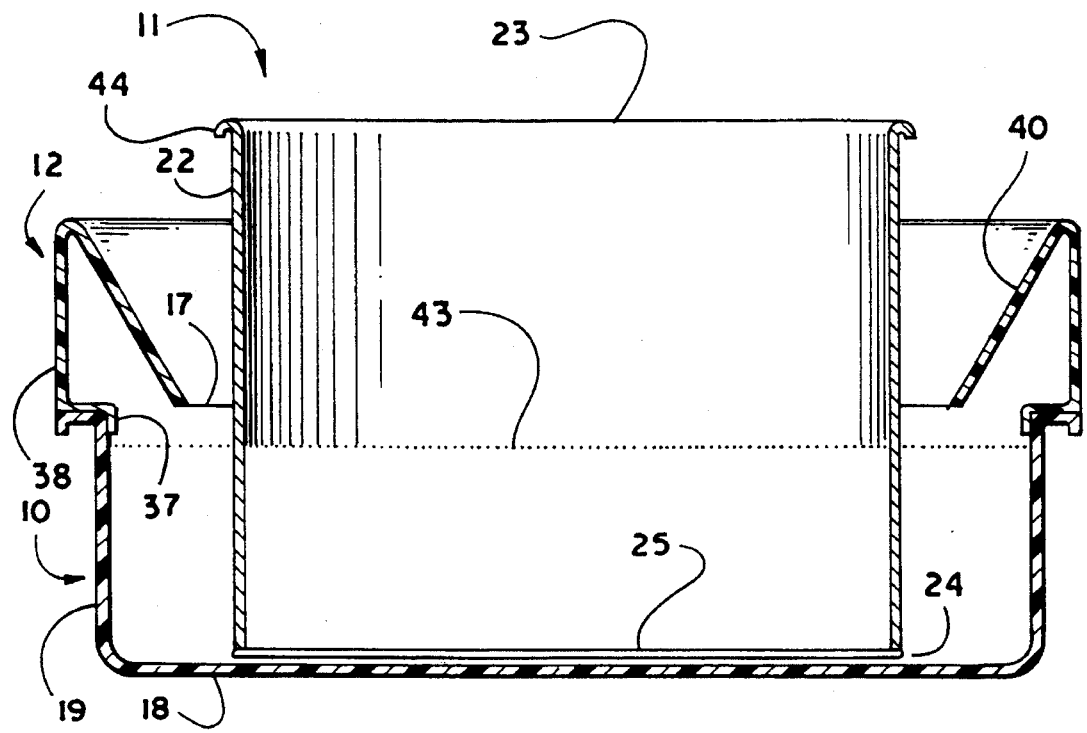
Fig_2
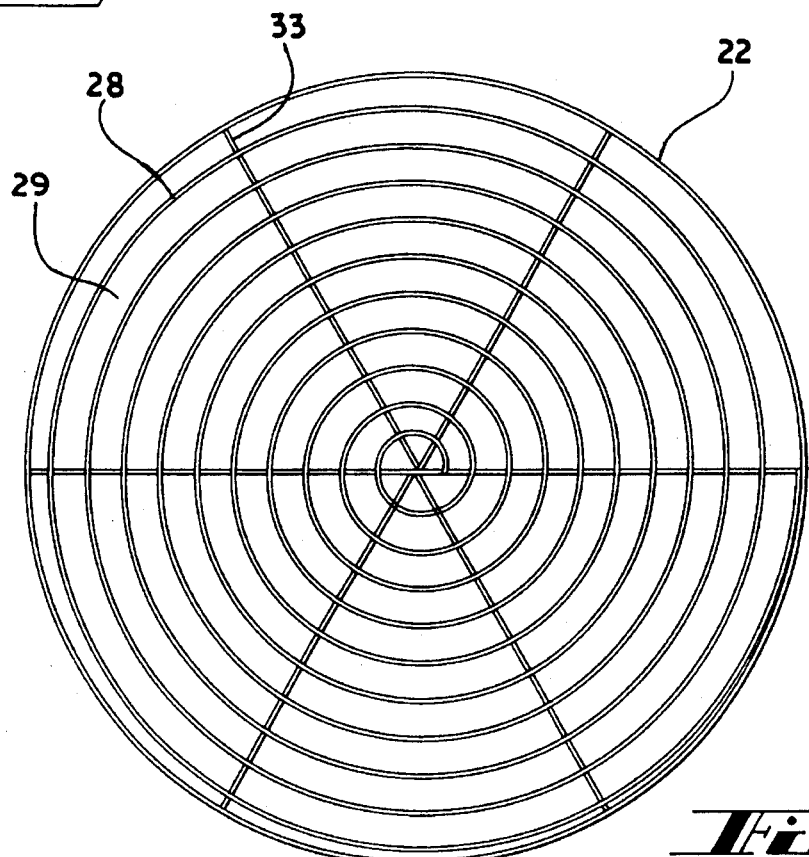
Fig_3

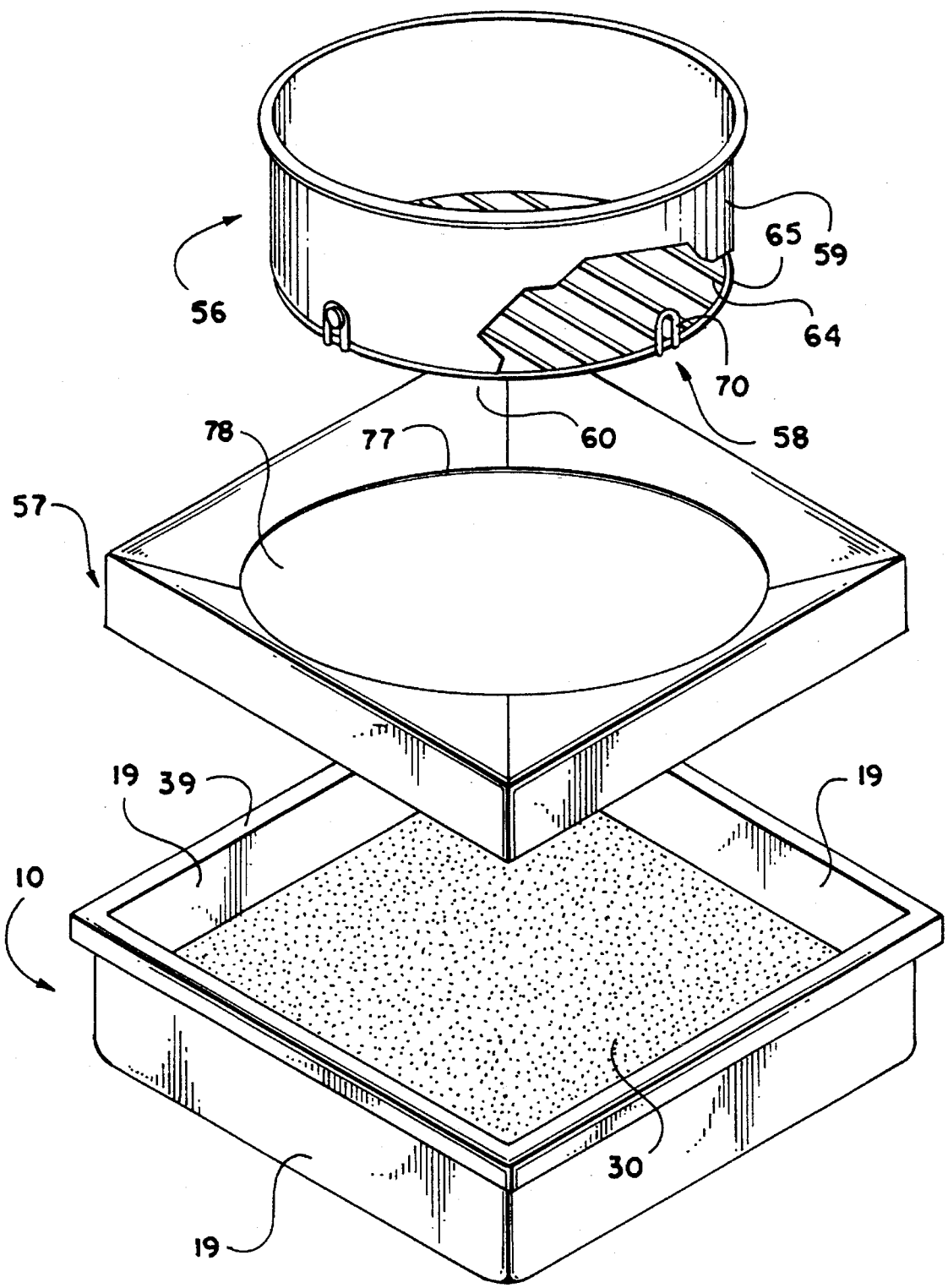

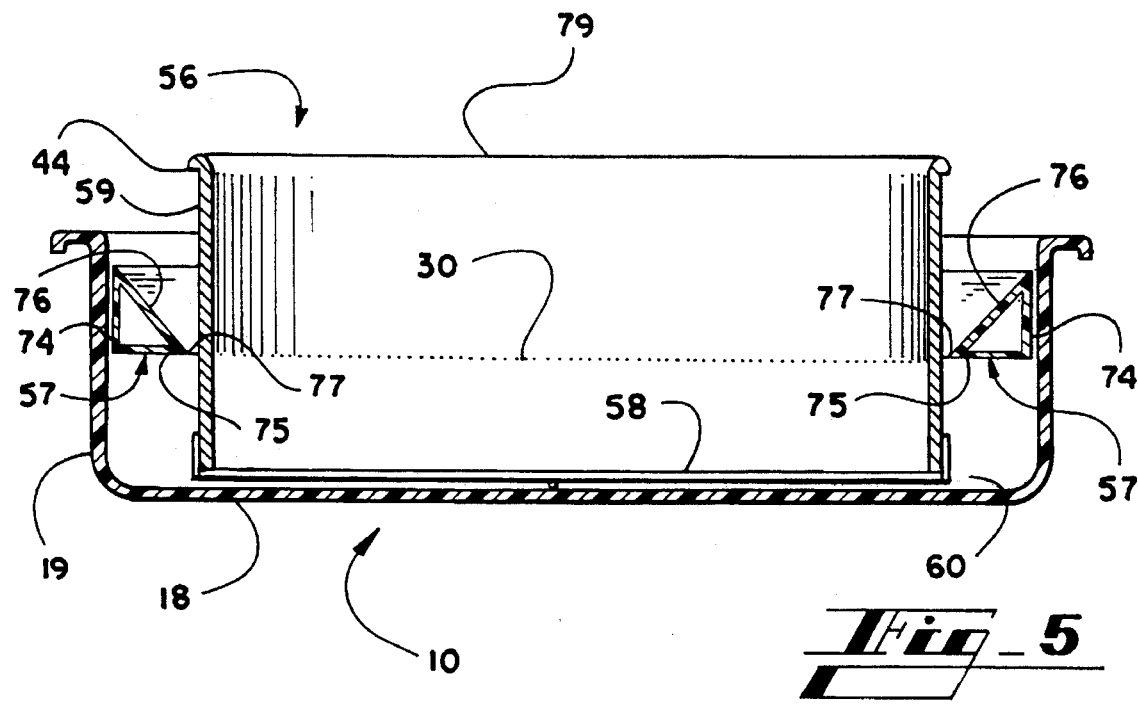
Fig_5
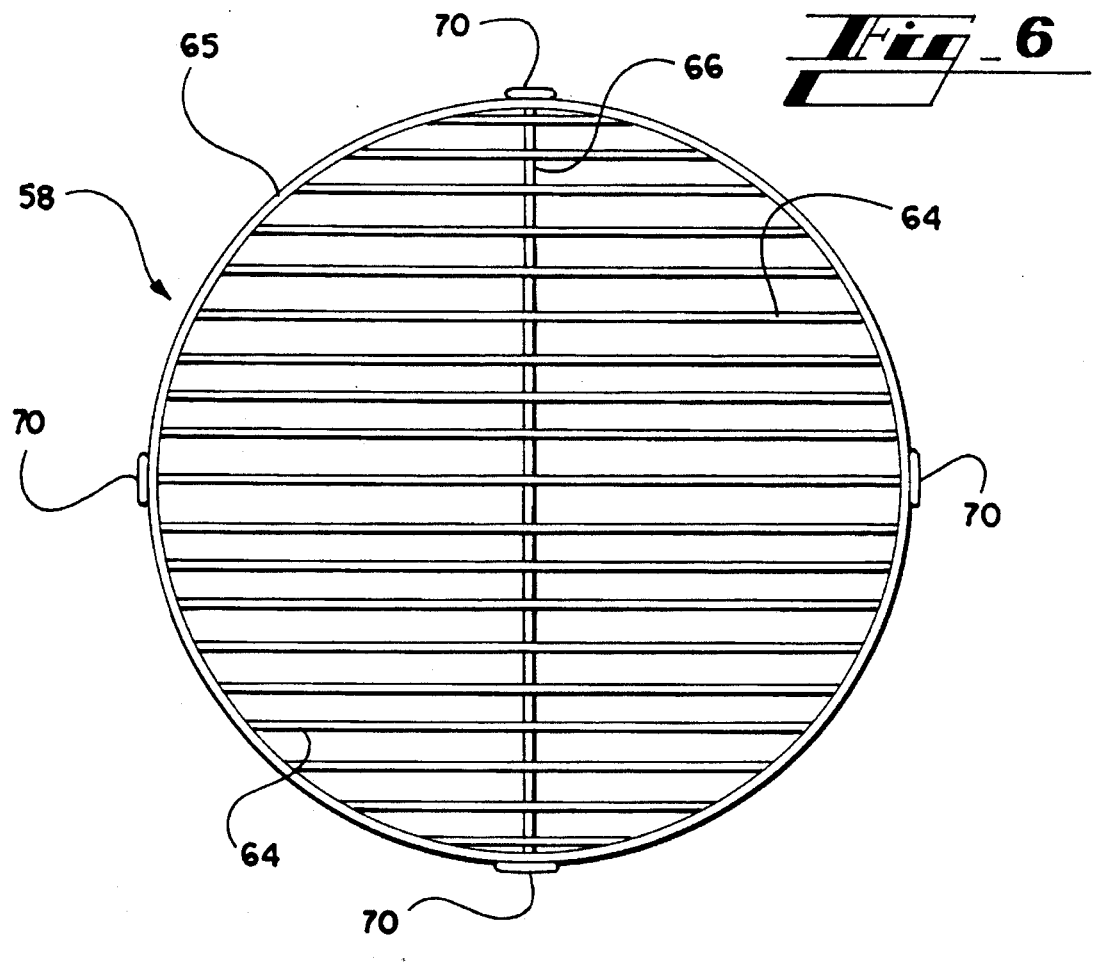
Fig_6

REMOVABLE SCREEN FOR ANIMAL LITTER BOX

CROSS-REFERENCE TO RELATES APPLICATION

This is a continuation-in-part of Ser. No. 08/122,765 filed Sep. 16, 1993 and now U.S. Pat. No. 54,341,763.

FIELD OF THE INVENTION

This invention relates in general to animal litter boxes, and in particular to a screen for use in combination with litter boxes for removing waste products.

BACKGROUND OF THE INVENTION

Owners of small pets, such as cats and dogs, must provide a sanitary facility for use by the animal, if that animal spends any substantial amount of time indoor. These sanitary facilities are commonly known as litter boxes, and usually comprise an open-topped box for holding a quantity of disposable litter for use by the animal. This litter, as it is commonly known, may be one of the commercially-available processed granular mineral materials of the kind well known to cat owners in particular, or may comprise a naturally-occurring material such as sand or the like. The commercially-available processed animal litters usually are preferred by pet owners, because those litter materials are absorbent and are intended to clot with the absorbed urine so that the clots form solid clumps of waste products that are readily removable from the litter box. Commercial litter materials also frequently include a deodorizer for neutralizing offensive odors from the litter box, thereby reducing the need for frequent cleaning of that box.

Cleaning an animal litter box, especially one used by cats, requires digging through the litter with a scoop or sifter to locate and remove solid waste products from the litter. Those waste products, including feces as well as clotted litter and urine, then are placed in a suitable bag or other waste container for disposal. This task is unpleasant and time-consuming, and requires some care to avoid spilling the granular material or the removed waste products onto the floor surrounding the litter box. Furthermore, the scoops or other implements used to extract the waste products from the litter need to be stored in some sanitary manner after each such use.

The prior art has recognized the problems associated with litter boxes. For example, U.S. Pat. No. 4,817,560 to Prince et al. discloses a litter box sifter in the form of a basket with a gridlike bottom and sides. This sifter basket is square or rectangular in shape, and fits within a litter box wherein the sifter basket conforms generally to the internal dimensions of the litter box. The sifter basket is lifted from the litter box to remove solid waste products from the litter box. According to that patent, the sifter basket is returned to the litter box by pressing the basket down into the box through the litter already in place within the box. However, it can be difficult to force the basket downwardly to the bottom of a closely-conforming box filled with liner, even when exerting substantial downward force on the basket.

Accordingly, it is an object of the present invention to provide an improved litter box.

It is another object of the present invention to provide an improved removable screen for use with a litter box.

It is a further object of the present invention to provide a litter box with a removable screen that fits within the litter box during normal use of the box and is relatively easily replaced in the litter box after withdrawing the screen to remove solid waste products.

It is a further object of the present invention to provide all animal litter box with a removable screen and a shield to cover portions of the litter box not containing the screen, so as to prevent unwanted ejection of litter material.

The foregoing and other objects of the present invention will become more readily apparent from the following discussion.

Stated in general terms, the present invention comprises a litter screen having a body preferably of circular shape, such as a right circular cylinder or frustocone. This litter screen fits within a litter box that may be conventional in shape, and the litter screen has a perforated lower end placed adjacent the bottom of the litter box. The upper end of the litter screen body is open to allow an animal to enter and use the litter box. To clean the litter box, the litter screen is lifted upwardly from the litter box so that solid waste products are withdrawn from the litter box and remain within the litter screen on the perforated lower end while the granular litter material sifts through the perforated end to remain in the litter box. After disposing of the solid waste products thus removed from the litter box, the litter screen is returned to the litter box by placing the lower end of the screen on the litter in the box, and then pressing downwardly on the litter screen while shifting the litter screen back and forth in the litter. This shifting may be as oscillation around the longitudinal axis of the litter screen, or may take place on it path perpendicular to the longitudinal axis depending, on the configuration of the lower end. This shifting movement facilitates returning the litter screen to the bottom of the litter box, and the circular cross-section shape of the litter screen makes possible that movement within a litter box of conventional rectangular or square configuration.

Stated in somewhat more specific terms, the present litter screen has an imperforate body of generally circular cross-section and open at an upper end. The lower end of the litter screen body is covered by a screen member defining perforations sized to prevent passage of substantially all solid waste products anticipated within an animal litter box, but large enough to permit easy passage of the granular litter material commonly used in litter boxes. The structure defining that screen preferably is arcuate or curvilinear in configuration in a first preferred embodiment, so that the structure does not unnecessarily impede the oscillating movement while thrusting the litter screen into the litter material remaining in the litter box. In another preferred embodiment, the screen structure comprises substantially straight members that do not unnecessarily impede a back-and-forth shifting movement of the litter screen on a path parallel to the straight members while thrusting the litter screen into the litter material remaining in the litter box.

BRIEF DESCRIPTION OF DRAWING

FIG. 1 is an exploded pictorial view, partly broken away for illustration, showing an animal litter box with removable screen according to a first preferred embodiment of the invention.

FIG. 2 is a vertical section view showing in assembly the apparatus depicted in FIG. 1.

FIG. 3 is a plan view of the screen structure in the apparatus depicted in FIG. 1.

FIG. 4 is an exploded pictorial view, partly broken away for illustration, showing an animal litter box with removable screen according to a second preferred embodiment of the invention.

FIG. 5 is a vertical section view showing in assembly the apparatus depicted in FIG. 4.

FIG. 6 is a plan view of the screen structure for the apparatus depicted in FIG. 4.

DETAILED DESCRIPTION OF PREFERRED EMBODIMENT

Turning first to FIG. 1, there is shown generally at 10 a litter box for receiving a litter screen 11. The apron 12 removably fits over the open upper end of the litter box, and the screen 11 fits through an opening 17 in the apron to enter the litter box. The litter box 10, which is generally rectangular in shape and has a liquid-impervious bottom 18 and side walls 19, may be of conventional shape and construction. It will become apparent that the litter box 10 alternately can be round or some other non-rectangular shape.

The litter screen 11 has an outer housing or body 22 generally circular in cross-section and cylindrical in shape. The body 11 thus defines an open upper end 23, and a lower end 24 covered by a screen element 25. This screen element 25 covers the entire lower end 24 of the body 22. The screen element in the preferred embodiment comprises a spiral coil 28, best seen in FIG. 3, having a single spiral rod extending in a flat plane from the outermost radial extent of the lower end 24 to terminate substantially at the center of the lower end. Alternatively, a screen element of concentric circular elements can be substituted for the spiral coil. The radial gap 29 between each adjacent turn of the spiral coil 28 is chosen so that little or none of the solid waste products expected in the litter box can fall between the spacing while the granular litter 30 (FIG. 1) readily sifts through the spiral coil whenever the screen 11 is removed from or inserted into the litter box 10. By way of example, the radial gap between adjacent turns can be in the range of ⅜ inch to ½ inch, although those dimensions are not considered critical to the present invention. It is preferred that the gap spacing be as large as will prevent the solid waste products from passing through the screen, because the relatively wider gap spacing reduces resistance to burying the screen element in the litter as described below.

The spiral coil 28 in a preferred embodiment of the present invention is made of stainless steel for desired structural strength and resistance to rust or corrosion. The coil strands are ⅛ inch in diameter in that embodiment: thicker strands would make burying the screen element in the litter more difficult. The radial braces 33 are attached to the lower end 24 of the body 22 and extend across that lower end in close juxtaposition above the spiral coil 28, so as to provide structural support for maintaining the integrity of the spiral coil. One of the braces 33 in the disclosed embodiment is a solid rod extending across the diameter of the lower end 24, and the other braces are radial members joined to the center of the solid rod by welding or the like. The body 22 itself is made of stainless steel in the preferred embodiment. However, it should be understood that the litter screen 11 alternatively can be fabricated from suitable plastic materials, and that the use of a particular material such as stainless steel is not a limitation critical to the present invention.

The apron 12, as previously mentioned and as best seen in FIG. 2, rests on the open upper end of the litter box 10. An inwardly-turned flange 37 is formed at the lower edge of the outer side 38 on the apron, and that flange fits over the rim 39 (FIG. 1) at the upper end of the litter box 10. The upper surface 40 of the apron returns downwardly and inwardly from the top edge of the upper side 38, terminating in a circular rim that defines the opening 17 in the apron. As best seen in FIG. 2, the diameter of the opening 17 is somewhat greater than the adjacent dimension of the litter screen body 22, so that the litter screen 11 fits through the opening with some small distance to spare. The litter screen 11 preferably should occupy as much area within the litter box 10 as is practical, short of contacting the side walls 19 of the litter box, so as to maximize the surface area of litter available within the litter screen 11 for use by cats or other animals.

The operation of the present litter box and removable screen is now discussed. Assuming either a fresh start with a newly-acquired litter box 10 and screen 11, or a complete reloading of an existing litter box, a supply of litter 30 is poured into the litter box with the apron 12 either in place on the litter box as shown in FIG. 2 or removed while adding the litter. The litter screen 11 may be positioned at a central location in the litter box 10 at this time for convenience, and the litter 30 preferably is distributed in the litter box both within the litter screen 11 and in the surrounding areas of the litter box outside the screen. The dotted line 43, which is just below the upper rim 39 of the litter box as shown in FIG. 2 indicates the fill level of the litter 30.

With the desired amount of litter added to the litter box, the apron 12—if previously removed—now is placed on top of the litter box surrounding the litter screen 11 as shown in FIG. 2. The litter box now is ready for use by cats or other animals, who must step into the litter screen through the open upper end 23 for access to the litter 30 in the box. Cats instinctively try to bury their waste by scratching or digging in the litter, and the extent of the body 22 above the litter in the litter screen, will reduce the amount of litter ejected from the litter screen. Furthermore, the inwardly-sloped top surface 40 of the apron 12 should catch at least some of the litter ejected from body 22 of the litter screen. That ejected material thus slides down the inwardly-sloped top surface 40 and reenters the litter box 10.

The litter box is cleaned simply by lifting the litter screen 11 upwardly from the litter box. This can be accomplished without removing the apron 12, if desired. As the litter screen 11 moves upwardly through the litter 30, solid waste products are captured by the screen element 25 and remain within the litter screen. However, the remainder or the litter material 30 readily sifts downwardly through the radial spacing 29 of the screen element, returning that litter material to the litter box. Once the litter screen 11 is removed from the litter box, the litter screen can be carried to a suitable location for dumping the waste products removed from the litter box. The entire litter screen 11 can be cleaned at this time by spraying with a garden hose, if desired. The litter screen 11 then is returned to the litter box by placing the litter screen downwardly so that the lower end 24 and the screen element 25 engage the upper surface of the litter 30 remaining the litter box. By pressing downwardly on the upper end 23 of the litter screen while simultaneously twisting or oscillating the litter screen around the vertical axis of the body 22, the litter screen is readily displaced downwardly through the granular litter 30 in the litter box. The spiral coil, making up the screen element 25 provides minimum resistance to this twisting or back-and-forth movement of the litter screen 11 while the litter screen is being pressed downwardly into the litter box 10. The radial braces 33, being located on the inside of the spiral coil 28, provides relatively low resistance to oscillation of the litter screen while giving axial support to the spiral coil during the thrusting motion. The upper edge of the body 22 preferably is rounded as shown at 44 to protect the hands of a person pushing the litter screen downwardly into the litter 30. With the litter screen 11 fully returned to the litter box so that the lower end 24 of the litter screen is adjacent to the bottom 18 of the litter box, the apparatus is ready for further use.

Turning next to FIGS. 4–6 the second preferred embodiment shown in those figures cooperates with the litter box 10, which may be as described hereinabove. This second embodiment also includes a litter screen 56 having an outer housing 59 generally circular in cross-section and cylindrical in shape, surrounded by a skirt 57 disposed within the litter box 10 instead of on the box as in the first embodiment. A screen element 58 covers the lower end 60 of the screen 56. Both the skirt 57 surrounding the screen 56, and the screen element 58 at the lower end of the screen, are different from the corresponding elements of the embodiment shown in FIGS. 1–3.

The screen element 58, as best seen in FIGS. 4 and 6, has a number of parallel bars 64 that extend to the outer edge of a ring 65 that is substantially coterminous with the lower end 60 of the outer housing 59. A cross bar 66 extends across the screen element 58 substantially at the midpoints of the bars 64 and transverse to those bars. The cross bar 66, as are the parallel bars 64, is joined to the ring 65 by any suitable technique such as welding or the like. The cross bar 66 also may be welded or otherwise joined to each of the bars 64 at the points of intersection with those bars. The parallel bars 64 and the cross bar 65 in the preferred embodiment are steel wire bars approximately ⅛ inch in diameter, and may be coated or plated to resist rusting or corrosion. Alternatively, it should be understood that other suitable metallic or nonmetallic materials may be substitute for steel in fabricating the screen element 58 and the outer housing 59.

The gap between adjacent ones of the parallel bars 64 is approximately ¼ inch in the preferred embodiment. This gap gives a spacing that provides good sifting of litter material in the litter box 10, and removal of solid waste products from within that litter material.

The screen element 58 is attached to the outer housing 59 of the screen 56 by means of the individual loops 70 secured to the ring 65 of the screen element. These rings 70 stand substantially upright from the ring 65 so as to be substantially parallel with the outer housing 59, and are secured to the outer housing by welding or with appropriate fasteners such as bolts, rivets, or the like.

Turning to the skirt 57 shown in FIGS. 4 and 5, that skirt rests on the upper surface of the litter 30 within the litter box 10 as best seen in FIG. 5 instead of resting on the open upper end of the litter box 10 as in the embodiment of FIGS. 1–3. The skirt 57 is an annular ring-like structure that entirely surrounds the screen 56 and has cross-sections in the shape of an isosceles triangle, as seen in FIG. 5. The skirt 57 thus has an outer wall 74 confronting the adjacent inside surface of the outer housing 59, a bottom wall 75 joining the outer wall at a right angle and resting on the upper surface of the litter 30 in the litter box, and a diagonal wall 76 connecting the distal ends of the outer wall and the bottom wall. The diagonal wall 76 thus slopes downwardly and inwardly from an upper and outer end located adjacent the outer housing 59, to a lower and inner end 77 defining the opening, 78 through which the litter screen 56 is received. The overall outer dimensions of the skirt 57 are somewhat less than the confronting dimensions of the litter box, so that the skin fits loosely in the litter box.

The opening 78 in the skirt 57 preferably is dimensioned so that the screen 56 is inset from the edge of that opening, with the screen and skirt received in a litter box 10. In the preferred embodiment, the inner edge 77 of the skirt 57 stands approximately one inch away from the outer housing 59 on all sides when the screen 56 is centered within the skirt. Spacing on that order facilitates removal of the screen 56 from the litter box, and also permits the back-and-forth movement needed to bury the screen element 58 within the litter 30 in the litter box.

The embodiment shown in FIGS. 4–6 operates in much the same way as the embodiment previously described. The screen 56 is placed in the litter box 10 with a supply of litter 30, and the skirt 57 is placed around the screen to rest on the surface of the litter. The elevation of the skirt 57, relative to the upper end 79 of the outer housing 59, thus is variable depending on the amount of litter in the litter box 10. As with the previously-described embodiment, the diagonal surface 76 of the skirt 57 will catch at least some of the litter ejected from the screen 56 by cats scratching or digging in the litter within that screen. The skirt 57 also effectively prevents cats from using the litter in the peripheral areas of the rectangular box 10 surrounding the circular screen 56.

The litter box shown in FIGS. 4–6 is cleaned by lifting the screen 56 upwardly from the litter box, capturing solid waste products by the screen element 58 while the remainder of the litter material sifts downwardly through the spaces between the parallel bars 64.

After disposing of the removed waste products and cleaning the screen 56, that screen then is returned to the litter box by placing the screen downwardly so that the lower end 60 and the screen element 58 rest on the upper surface of the litter remaining in the litter box. The screen 56 then is oscillated or translated in a back-and-forth movement substantially parallel with the longitudinal extent of the bars 64 making up the screen element 58. By pressing downwardly on the screen 56 while thus moving that screen back and forth within the litter box, the litter screen is displaced downwardly through the granular litter in the litter box. With the screen 56 returned to a desired position within the litter box, the skirt 57 can be replaced within the litter box, in the peripheral space between the outer housing 59 and the litter box.

The skirt 57 may be hollow or solid in section. That skirt may have a round, oval, or rectangular overall configuration, depending on the shape of the litter box. Similarly, the opening 78 within the skirt 57 may be a shape other than round, if the skirt is to accommodate a screen whose outer housing is of a corresponding noncylindrical shape. As an alternative to the triangular cross-shape shown in FIG. 5, the skirt 57 can be made with only two sides, for example, joined together at an acute angle between the sides. In the case of the two-sided shape, one side of the modified skirt would be substantially parallel to the outer housing 59 of the screen and the other side would constitute the diagonal surface extending downwardly and inwardly toward the opening for accommodating the screen 56; the open lower end of the inverted two-sided skirt would rest on the top surface of the litter in the litter box. Alternatively, the two-sided skirt could have a lower side resting on the litter and a diagonal side extending upwardly from one edge of that lower side, thereby defining an open face confronting the side of the screen outer housing.

The present apparatus helps reduce the dust previously associated with handling the typical animal litter. When the litter screen 11 or 56 is removed from the litter box 10, the apron 12 on the litter box or the skin 57 within the litter box helps contain the dust produced as the litter sifts through the screen element and returns to the box. The presence of the apron or skirt also confines the dust stirred up when the litter screen is being reinserted into the litter in the box. Furthermore, the relative ease of removing the present litter screen from the litter box and then returning the litter screen to the box shortens the time required for cleaning the litter box.

Although the body 22 of the litter screen 11 and the outer housing, 59 of the litter screen 56 in the preferred embodiments are the shape of a right circular cylinder, it should be understood that other cylindrical shapes of the body are contemplated within the scope of the present invention so long as such alternative shape does not unduly impede insertion of the litter screen into the litter box. For example, a body in the shape of a hollow truncated cone is one alternative to the right circular cylindrical body 22 of the preferred embodiment.

It should be understood that the foregoing relates only to a preferred embodiment of the present invention, and that numerous changes and modifications thereto may be made without departing from the spirit and scope of the invention as defined in the following claims.

What is claimed is:

1. An animal litter box with a litter screen, comprising in combination:

a box having a liquid-imperious bottom and sides effective to receive and contain a quantity of animal litter; and a litter screen removably disposed in the box:

the litter screen having a hollow cylindrical body;

the body having an open upper end to allow an animal to enter the hollow body and use the litter box;

a skirt surrounding the body of the litter screen and disposed in the box, the skirt having a surface extending inwardly from the sides of the box to define a central opening for receiving the litter screen so that the skirt can catch litter scratched from within the litter screen by animals using the litter box; and the litter screen having a perforated lower end associated with the body;

the perforated lower end being operative to sift solid waste products from the litter and retain those waste products within the litter screen while the litter flows through the perforated lower end as the litter screen is lifted from the box, whereby the litter screen, after the retained waste products are discarded, can be returned to the box by placing the lower end on the litter in the box and thrusting downwardly on the body while oscillating the litter screen around the vertical axis of the body.

2. Apparatus as in claim 1, wherein:

the skirt rests on the surface of the litter contained in the box.

3. Apparatus as in claim 1, wherein:

the skirt has an outermost extent inwardly from the sides of the box so that the skirt fits loosely within the box and can rest on the surface of litter contained in the box.

4. Apparatus as in claim 1, wherein:

the central opening in the skirt is substantially larger than the body of the litter screen received in the central opening, thereby permitting the oscillation of the litter screen to return the lower end thereof into the litter without substantially oscillating the skirt surrounding the litter screen.

5. Apparatus as in claim 1, wherein:

the skirt has an outermost extent inwardly from the sides of the box so that the skirt fits loosely within the box and can rest on the surface of litter contained in the box: and the central opening in the skirt is substantially greater than the body of the litter screen received therein, thereby permitting misalignment of the litter screen within the central opening.

\* \* \* \* \*